United States Patent [19]
Ladin et al.

[11] 3,858,288
[45] Jan. 7, 1975

[54] METHOD OF MAKING A BALL BEARING ASSEMBLY

[75] Inventors: Eli M. Ladin, Ann Arbor, Mich.; Paul D. Green, Shelbyville, Ind.

[73] Assignee: Federal-Mogul Corporation, Southfield, Mich.

[22] Filed: Nov. 12, 1973

[21] Appl. No.: 414,787

[52] U.S. Cl. .............................. 29/148.4 A, 29/413
[51] Int. Cl. ...................... B23p 11/00, B23p 17/00
[58] Field of Search ........ 29/148.4 A, 148.4 R, 413; 308/195, 196

[56] References Cited
UNITED STATES PATENTS

| | | | |
|---|---|---|---|
| 822,723 | 6/1906 | Conrad | 308/195 |
| 2,702,216 | 2/1955 | Stearns | 29/413 X |
| 3,140,130 | 7/1964 | Barr | 308/216 |

*Primary Examiner*—Thomas H. Eager
*Attorney, Agent, or Firm*—Harness, Dickey & pierce

[57] ABSTRACT

A method of making an anti-friction bearing assembly for rotatively supporting a load for rotation about the bearing axis, and in particular a novel method of splitting the annular outer race member of the bearing assembly so that it can be temporarily circumferentially expanded to permit assembly of anti-friction bearing elements into the raceways of the bearing. Creation of the crack, or split, in the initially solid, continuous outer race member is facilitated by providing a stress raiser at a location on the inner periphery of the member. Such a stress raiser may be provided by various techniques, one of which is by provinding a radial passage through the member. When a cracking force is applied to the member, this stress raiser encourages propagation of a very clean crack.

24 Claims, 3 Drawing Figures

METHOD OF MAKING A BALL BEARING ASSEMBLY

BACKGROUND AND SUMMARY OF THE INVENTION

The present invention relates to a novel method for making bearings of the type adapted to rotatively support a load for rotation about the bearing axis and includes a novel method of splitting an annular element of a bearing assembly.

Two prior art patents which disclose methods of making a bearing assembly are U.S. Pat. No. 822,723 and U.S. Pat. No. 2,702,216. In the former patent the bearing balls are assembled into the bearing with the inner race member eccentrically oriented relative to the outer race member. After the bearing balls have been so assembled, the inner race member is made concentric with the outer race member while the balls are distributed circumferentially around and between the two members riding in the raceways thereof. The bearing balls are customarily caged. One problem with this arrangement is that a full complement of bearing balls cannot be assembled into the bearing. In the latter patent the outer race member is split by what is termed either a crack line or a split line. A full complement of bearing balls is assembled into the bearing by first separating the ends of the outer race member at the split line to thereby temporarily circumferentially expand the outer race member. The balls are then assembled into the bearings after which the outer race member is released. The outer race member returns it to its initial shape, thereby constraining the bearings between the raceways of the inner and outer race members. The method of the latter patent provides an axial groove in the outer surface of the outer race member which facilitates the formation of the split line. Thus, in the finished bearing assembly according to the U.S. Pat. No. 2,702,216, an axial groove exists in the outer surface of the outer race member.

Heretofore, bearings of the type to which the present invention relates have proved unsatisfactory when used in applications where relatively high-impact loads are repeatedly encountered. This is the case for the wheel bearings used in guiding the lift of a fork lift truck where presently used bearings are only marginal in performance. One solution to the problem, of course, is to replace the bearings of the type shown in U.S. Pat. No. 822,723 with others of the same type, but larger, having a higher load rating. However, such a solution is undesirable since it means that due to the increase in bearing size, the entire bearing assembly, including related portions of the lift construction will be larger and result in increased cost. On the other hand, it has been found that bearings of the type shown in U.S. Pat. No. 2,702,216 have chips, spalls and other surface imprefections formed at the raceway along the crack line as a result of the methods described therein for causing the crack.

Among the objects of the present invention is the provision of a novel method of cracking the outer race members of anti-friction bearings to thereby provide improved, high-impact capacity bearings which last longer than prior bearings used for high-impact applications, yet are of comparable size and weight, which are easier to manufacture and assemble, and which in other respects achieve important advantages over prior bearings.

The present invention provides an improved method of making a bearing which permits a full complement of bearing elements to be conveniently assembled into the bearing, results in less scrap, is more reliable than prior methods, and produces a better bearing without complicating the bearing construction.

The foregoing objects, as well as additional objects, advantages and benefits of the invention will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated, for carrying out the invention.

DESCRIPTION OF THE PREFERRED EMBODIMENT

Figure 2:
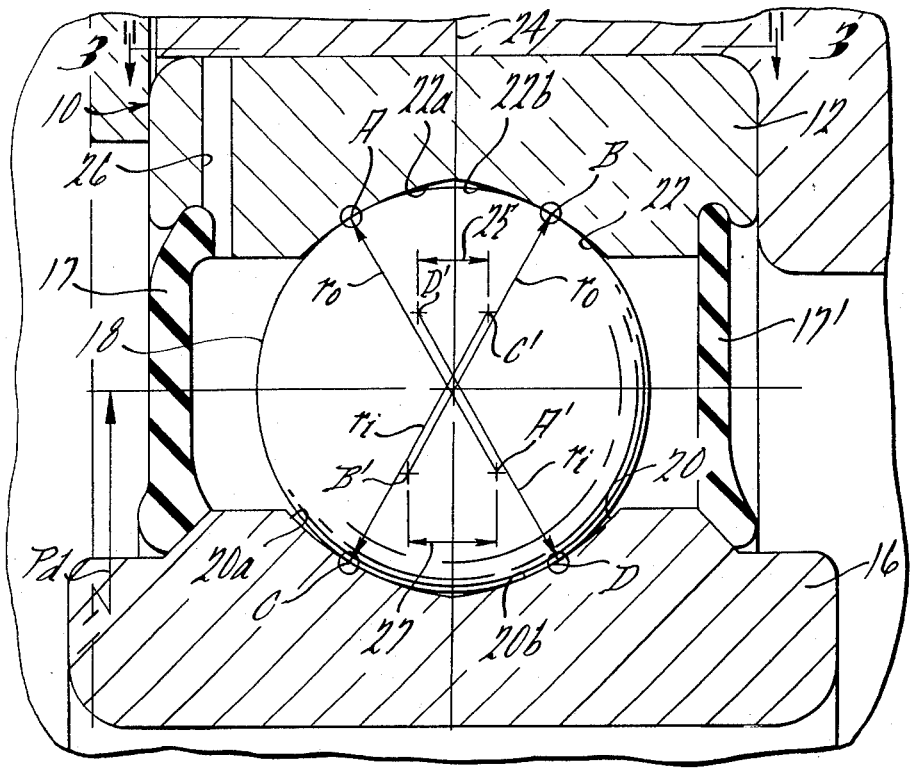
FIG. 2 is an enlarged, sectional view taken in the direction of arrows 2 2 in FIG. 1.
Figure 1:
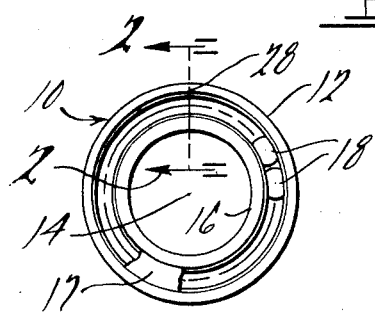
FIG. 1 is an axial end view of a bearing according to the present invention.
Figure 3:
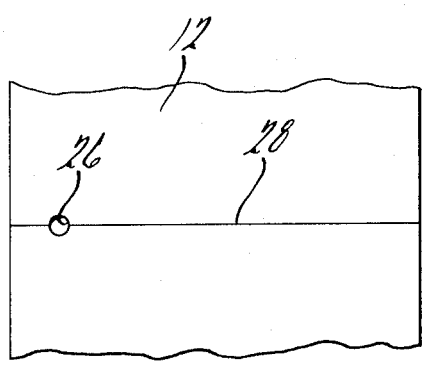
FIG. 3 is a reduced fragmentary view taken in the direction of arrows 3—3 in FIG. 2.

In FIGS. 1, 2, and 3, a bearing 10 made according to the method of the present invention comprises an annular outer race member 12 disposed concentrically around the axis 14 of the bearing, an annular inner race member 16 coaxial with and circumferentially encompassed by outer race member 12, and a plurality of identical spheroidal bearing balls 18 constrained between the two race members. Inner race member 16 comprises a radially outwardly facing annular raceway 20 extending around the outside thereof, and outer race member 12, a radially inwardly facing annular raceway 22 extending around the inside thereof.

In axial cross section as shown in FIG. 2, each raceway 20 and 22 is preferably shaped to have a multi-point contact, such as a two-point contact, with each bearing ball 18, the points of contact being indicated at A, B, C, and D, respectively. Each raceway 20 and 22 comprises a pair of annular intersecting surfaces 20a and 20b for raceway 20, and 22a and 22b for raceway 22. In axial cross section, surfaces 20a and 22a lie on one side of an imaginary radial line 24 (FIG. 1) through the center of the ball 18, while surfaces 20b and 22b lie on the other side of line 24. Each surface 20a and 20b has the same radius of curvature (designated $r_i$). The center of curvature for surface 20a (designated C') is located radially outwardy beyond the bearing pitch diameter (designated $P_d$) and on the opposite side of line 24 from surface 20a; the center of curvature for surface 20b (designated D') is located radially outwardly beyond pitch diameter $P_d$ and on the opposite side of line 24 from surface 20b. Similarly, surfaces 22a and 22b have the same radius of curvature (designated $r_o$). The center of curvature for surface 22a (designated A') is located radially inwardly of bearing pitch diameter $P_d$ and on the opposite side of line 24 from surface 22a; the center of curvature for surface 22b (designated B') is located radially inwardly of bearing pitch diameter $P_d$ and on the opposite side of line 24 from surface 22a. It will be observed that while the bearing construction is symetrical about line 24, the construction need not necessarily be symmetrical in axial cross section about the center of each bearing ball 18. For example, note that the distance between points C' and D' (designated by the numeral 25) is somewhat less than the distance between points A' and B' (designated by the numeral 27). The illustrated construction is particularly advantageous, for the load points A, B, C, and D result in the load being distributed in a pressure ellipse at each load point. By providing two-point contact with each raceway, the impact capability of the bearing can be significantly increased without increasing the size of the bearing. This is particularly advantageous in applications subjected to high-impact loads as described earlier. While the particular two-point contact bearing feature described above in detail is considered of particular practical significance, any multiple contact bearing is considered of advantage over the standard single contact more conventional bearings used heretofore in similar applications. It will also be noted that bearing 10 contains a full complement of bearing balls 18 thereby further enhancing the bearing load carrying characteristics. Preferably, annular seals 17 and 17' are disposed on opposite sides of the assembly to keep contaminants away from the raceways and balls. Also, the bearing is preferably lubricated by suitable lubricant. The construction of bearing 10 is also disclosed in the co-pending application of the same inventors entitled "New High Impact Capacity Ball Bearing Assembly" filed concurrently herewith.

The present invention provides the following method whereby anti-friction bearing elements, such as balls 18, may be assembled into bearing 10 without deleteriously affecting the strength, complexity, or size of the bearing. Outer member 12 is initially a solid, circumferentially continuous ring. A radial passage 26 in the form of a small, thin circular bore is provided through the outer race member 12 adjacent one axial end of bearing 10. Outer race member 12 is then split in conventional fashion by means of a crack, or split, line 28. It has been found that the provision of passage 26 facilitates the formation of crack line 28 and substantially reduces the number of scrap pieces heretofore generated by splitting solid outer rings lacking passage 26. It has been found that the present invention utilizing a radial passage in the outer race member to facilitate creation of the split line results in better production than with the method disclosed in the above U.S. Pat. No. 2,702,216. The crack line 28 thus formed is generally parallel to a plane passing through axis 14 and intercepts passage 26. A full complement of bearing balls 18 is readily assembled into bearing 10 by moving the ends of members 12 at crack line 28 apart. The bearing balls 18 are introduced between the separated ends of member 12 into raceways 20 and 22. When a full complement of bearings has been assembled, member 12 is returned to its initial shape. The completed bearing 10 is illustrated in FIG. 1. The bearings may be caged or not, as desired.

It is further contemplated that other specific cracking techniques may be employed within the scope of the present invention to attain the same result. This is because the invention in its broadest aspect involves the provision of a "stress raiser" on the inner periphery of the annular bearing member prior to the splitting thereof. Various techniques may be employed to create such a stress raiser in the bearing member prior to splitting. The radial passage 26 is only one such technique. It is contemplated, for example, that a radial hacksaw cut could be made across one end surface of the member. Also, the passage 26 could be at various locations axially of the member. It is even forseen that acceptable cracking can occur where passage 26 does not extend completely through member 12; for example, where a hole is radially bored into the race member from the outside thereof to a point substantially near the inner circumferential surface, but not clear through, this would provide the necessary stress raiser and a cleaner crack than is obtainable by the presently known conventional means as shown in U.S. Pat. No. 2,702,216. The theory behind the provision of the stress raiser is that when a compressive load is placed upon the outer circumference of the race member, the inner circumference is in tension. By providing a nick or small hole or other discontinuity at or very near this surface which is in tension, the propagation of a very clean crack along the line of greatest tension is encouraged.

A preferred method for cracking member 12 is as follows. The initially solid, circumferentially continuous member 12 with passage 26 therein is placed between two flat, parallel, relatively movable plates one of which is stationary and the other of which is hydraulically actuated for movement toward and away from the stationary plate. Member 12 is positioned between the two plates and circumferentially oriented such that its axis is perpendicular to the direction of travel of the movable plate and the axis of passage 26 is parallel to the direction of travel of the movable plate. The movable plate is initially positioned so that each plate just contacts the outer periphery of member 12. Thus each plate has a line contact with member 12 and these lines of contact are, of course, 180° apart about the axis of member 12 and parallel to the axis of member 12. The movable plate is then forced toward the stationary plate thereby applying a compressive load on member 12. Assuming for the moment that passage 26 were absent, the regions of greatest tensile stress in member 12 occur on the inner circumference thereof at locations lying on an imaginary plane passing through the lines of contact of member 12 with the respective plates. Thus absent passage 26, there are two regions of maximum tensile stress 180° apart on the inner periphery of member 12. However, because passage 26 intersects one of these regions, the tensile stress at this one region is much larger for a given compressive loading applied to member 12. Accordingly, as the loading is increased, a point is reached where member 12 finally splits at the stress raiser to form crack line 28. The crack thus formed provides a much cleaner crack than heretofore achieved by prior techniques. This is especially important since it means that imperfections in raceway 22 at crack line 28 are minimized, or substantially eliminated. It will be appreciated, of course, that various other mechanical techniques may be employed for splitting member 12 other than that just described.

It is to be understood that the foregoing description is that of a preferred embodiment of the invention. Various changes and modifications may be made without departing from the spirit and scope of the invention as defined by the appended claims.

What is claimed is:

1. The method of amking a bearing of the type adapted to support a rotating load for rotation about the axis of the bearing and comprising an annular outer bearing member coaxially disposed around the axis of the bearing, said outer bearing member comprising a radially inwardly facing annular raceway extending around the inside thereof, an inner bearing member coaxial with and circumferentially encompassed by said outer bearing member, said inner bearing member comprising a radially outwardly facing annular raceway extending around the outside therof and a plurality of bearing elements confined between said two members and riding in the raceways thereof, said method comprising the steps of forming a radial passage through said outer bearing member, forming a crack line through said outer bearing member to intersect said passage and split the outer member into a circumferentially discontinuous element having opposed ends terminating at the crack line, separating said ends of said outer member, assembling said bearing elements into the bearing raceways while said ends of said outer member are separated, and returning said outer member to its initial shape so that the bearing elements are retained in the bearing raceways between the two bearing members.

2. The method of claim 1 wherein said radial passge is formed as a small, thin bore.

3. The method of claim 2 wherein said bore is formed to be perpendicular to the bearing axis.

4. The method of claim 1 wherein said passage is formed to extend completely through said outer member.

5. The method of claim 1 wherein said passage is formed to be perpendicular to the axis of the bearing.

6. The method of claim 1 wherein said passage is formed to have a circular cross-sectional shape.

7. The method of claim 1 wherein said passage is formed adjacent one axial end of said outer member.

8. The method of splitting an initially circumferentially continuous annular bearing element which comprises the steps of: providing a stress raiser at a location adjacent the inner periphery of said annular element; applying a force to said element such that maximum tensile stress in said element is developed at said stress raiser; and providing sufficient magnitude of such force to thereby finally split said element.

9. The method of claim 8 wherein said stress raiser is provided by forming a generally radial passage in said element.

10. the method of claim 9 wherein said passage is formed as a small thin bore.

11. The method of claim 10 wherein said small thin bore is formed with a circular shape.

12. The method of claim 9 wherein said radial passage is formed to extend completely through said element.

13. The method of claim 9 wherein said passage is formed to be perpendicular to the axis of said element.

14. The method of claim 13 wherein said force is applied in the direction of said passage.

15. The method of claim 9 wherein said force is applied radially inwardly of said element in a plane passing through at least a portion of said passage.

16. The method of claim 15 wherein said force is applied perpendicular to the axis of said element.

17. The method of claim 8 wherein said stress raiser is provided intermediate the axial ends of said element.

18. The method of claim 8 wherein said force is applied radially inwardly of said element in a radial plane passing through said stress raiser.

19. The method of splitting a circumferentially continuous annular bearing element having a raceway extending around its inner periphery, said method comprising the steps of: providing a stress raiser at a location on the inner periphery of said element substantially near the surface of said raceway; and applying a force to said bearing element such that sufficient stress is developed at such stress raiser to split said bearing element substantially at said stress raiser.

20. The method of claim 19 wherein said force is applied to have a component thereof directed radially inwardly of said element.

21. The method of claim 20 wherein said component of force is applied in a radial plane passing through said stress raiser.

22. The method of claim 19 wherein said stress raiser is provided by forming a generally radial passage in said element.

23. The method of claim 22 wherein said radial passage is formed to extend completely through said element.

24. The method of claim 23 wherein said passage is formed to lie axially adjacent said raceway.

* * * * *